United States Patent [19]

Tateishi et al.

[11] Patent Number: 4,564,399

[45] Date of Patent: Jan. 14, 1986

[54] AMORPHOUS ALLOY FOR MAGNETIC HEAD AND MAGNETIC HEAD WITH AN AMORPHOUS ALLOY

[75] Inventors: Hiroshi Tateishi, Zushi; Susumu Hashimoto, Tokyo, both of Japan

[73] Assignee: Tokyo Shibaura Denki Kabushiki Kaisha, Kawasaki, Japan

[21] Appl. No.: 573,379

[22] Filed: Jan. 24, 1984

[30] Foreign Application Priority Data

Jul. 26, 1983 [JP] Japan ............................... 58-136608

[51] Int. Cl.[4] .............................................. C04B 35/00

[52] U.S. Cl. ................................ 148/31.55; 148/403; 420/435

[58] Field of Search ............................ 148/403, 31.55; 420/435

[56] References Cited

U.S. PATENT DOCUMENTS

| | | | |
|---|---|---|---|
| 4,236,946 | 12/1980 | Aboaf et al. | 148/31.55 |
| 4,306,908 | 12/1981 | Takayama et al. | 148/403 |
| 4,464,208 | 8/1984 | Tateishi et al. | 148/31.55 |

FOREIGN PATENT DOCUMENTS

| | | | |
|---|---|---|---|
| 0048888 | 4/1982 | European Pat. Off. | 148/403 |
| WO81/00861 | 4/1981 | PCT Int'l Appl. | 148/403 |

*Primary Examiner*—John P. Sheehan

*Attorney, Agent, or Firm*—Oblon, Fisher, Spivak, McClelland & Maier

[57] ABSTRACT

An amorphous alloy for a magnetic head has a composition which may be represented as $$Co_{100-T-X-Y-Z}Re_THf_XB_YSi_Z,$$

where T, X, Y and Z satisfy the conditions of $0.2 \leqq T \leqq 1.5$, $6 \leqq X \leqq 15$, $3 \leqq Y \leqq 8$ and $0 \leqq Z \leqq 0.01$. Such an amorphous alloy has a high crystallization temperature, said temperature being higher than 500° C., and does not lower the effective magnetic permeability, even if gradual cooling is performed after heat treatment. A magnetic head having a core consisting of such an amorphous alloy is not deteriorated in its magnetic properties, even if the head is made by glass bonding.

8 Claims, 1 Drawing Figure

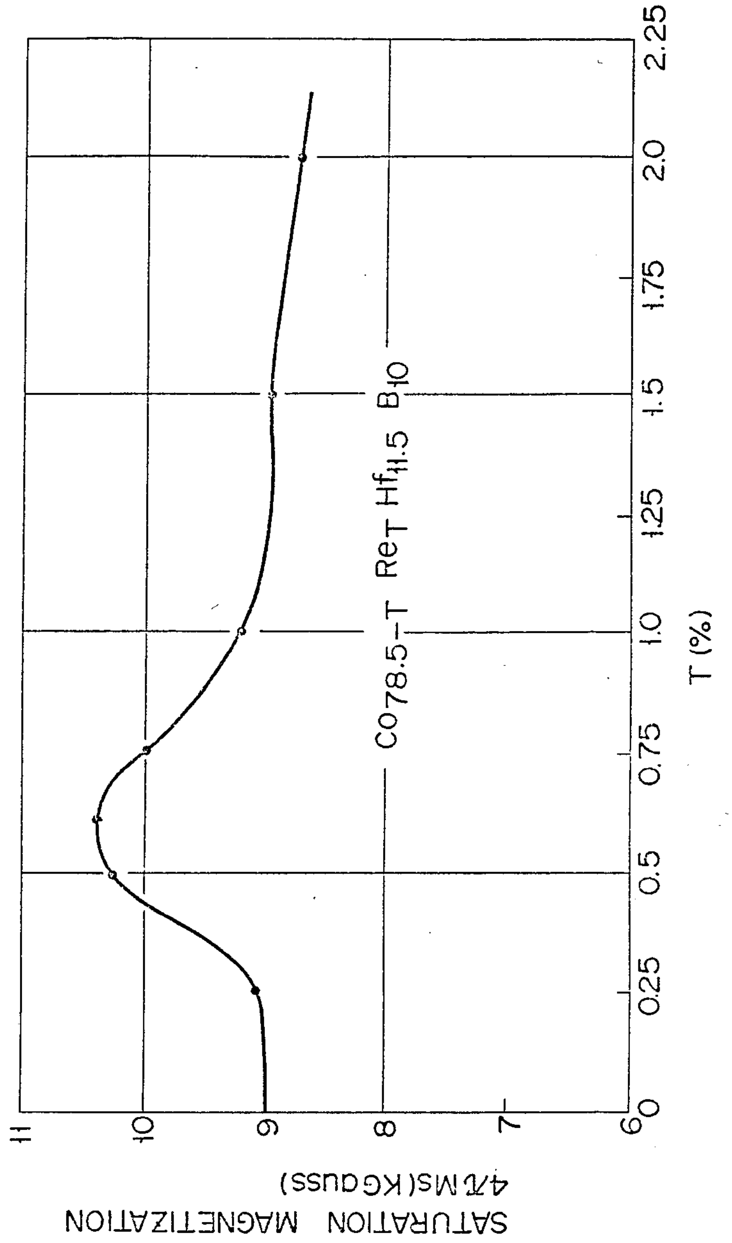
$Co_{78.5-T}\ Re_T\ Hf_{11.5}\ B_{10}$
T (%)
0
0.25
0.5
0.75
1.0
1.25
1.5
1.75
2.0
2.25
SATURATION MAGNETIZATION
$4\pi Ms$ (KGauss)
6
7
8
9
10
11

AMORPHOUS ALLOY FOR MAGNETIC HEAD AND MAGNETIC HEAD WITH AN AMORPHOUS ALLOY

BACKGROUND OF THE INVENTION

The present invention relates to an amorphous alloy which is used as a core material for a magnetic head, and a magnetic head with an amorphous alloy.

In magnetic heads conventionally used for magnetic recorders/reproducers, a highly magnetic permeable material having a crystalline structure is employed, such as an Fe—Ni alloy (Permalloy) or an Fe—Si—Al alloy (Sendust). However, the Fe—Ni alloy has a disadvantage, in that its wear resistance is low; and, although the Fe—Si—Al alloy has good wear resistance, it also has disadvantages, in that its mechanical strength, brittleness and plastic processing capacity is low.

The amorphous alloy having no crystalline structure, such as a Co—Fe—Ni—Si—B alloy, has recently been identified as an ideal material for a magnetic head. Such amorphous alloys have excellent magnetic properties, such as high saturation magnetization and low magnetostriction, along with high mechanical strength, good wear resistance and good processing capacity.

However; in general, the magnetic head used for a VTR (video tape recorder) must be stably and rigidly. Therefore, especially, the core halves of the magnetic head of a VTR is normally secured each other with a glass adhesive to form the gap. The glass bonding process involved requires heat treatment at a temperature higher than 400° C., and a gradual cooling after heat treatment. However, the amorphous alloys all have their respective crystallization temperatures; and the magnetic properties and, particularly, the effective magnetic permeability of the amorphous alloy are deteriorated by heat treatment at a temperature in the vicinity of the crystallization temperature. Further, the conventional low magnetostriction amorphous alloys contain at least two or more of the magnetic elements comprised of Co, Fe and Ni. Consequently, an induction magnetic anisotropy is produced by the heat treatment, and the magnetic properties of the amorphous alloys are thereby deteriorated. Thus, the conventional amorphous alloys have disadvantages, in that the practicability of using them for the magnetic head of a VTR is low.

Thus, there is a present need for an amorphous alloy whose magnetic properties do not deteriorate after glass bonding; i.e., for an amorphous alloy which has a crystallization temperature higher than the temperature necessary for a glass bonding heat treatment (i.e., higher than 500° C.), whose magnetic properties do not deteriorate, even with the gradual cooling which occurs after heat treatment. If only one of the magnetic elements is contained in the amorphous alloy, the deterioration, after gradual cooling, of the effective magnetic permeability of an amorphous alloy having this composition can be prevented. However, such an amorphous alloy has certain disadvantages, in that the requirements for high saturation magnetization and low magnetostriction cannot be satisfied.

As described above, a magnetic head with an amorphous alloy bonded by a glass adhesive is not yet provided, which magnetic head has high saturation magnetization and low magnetostriction and maintain a high level of effective magnetic permeability.

SUMMARY OF THE INVENTION

A primary object of the present invention is to provide an amorphous alloy for a magnetic head, which alloy has excellent magnetic properties, such as high saturation magnetization and low magnetostriction.

Another object of the present invention is to provide an amorphous alloy for a magnetic head, which alloy has a crystallization temperature higher than 500° C. and undergoes no deterioration of its magnetic properties, such as its effective magnetic permeability, even in a heat treatment combined with a gradual cooling.

Still another object of the present invention is to provide a magnetic head which exhibits excellent magnetic properties, without lowering its effective magnetic permeability, even if a core composed of an amorphous alloy having high saturation magnetization and low magnetostriction is subjected to a glass bonding heat treatment.

According to the present invention, an amorphous alloy for a magnetic head is provided, which alloy has a composition represented by the following formula:

$$Co_{100-T-X-Y-Z}Re_THf_XB_YSi_Z,$$

where T, X, Y and Z respectively represent the atomic density of elements Re, Hf, B and Si, and satisfy the following inequalities:

$$0.2 \leqq T \leqq 6 \quad (1)$$

$$6 \leqq X \leqq 15 \quad (2)$$

$$3 \leqq Y \leqq 14 \quad (3)$$

$$0 \leqq Z \leqq 11 \quad (4)$$

$$0.5 \leqq X/(X+Y) \leqq 5/6 \quad (5)$$

BRIEF DESCRIPTION OF THE DRAWINGS

This invention can be more fully understood from the following detailed description when taken in conjunction with the accompanying drawing, in which:

The FIGURE is a graph showing the effect of a Co—Re—Hf—B alloy on saturation magnetization, in cases where Co is substituted for Re.

DETAILED DESCRIPTION OF THE PREFERRED EMBODIMENTS

An amorphous alloy for a magnetic head according to the present invention comprises a substance represented by the following formula:

$$Co_{100-T-X-Y-Z}Re_THf_XB_YSi_Z,$$

where T, X, Y or Z represent the atomic density of the element Re, Hf, B or Si in the amorphous alloy. In this case, the composition of the amorphous alloy is so determined that the T, X, Y and Z factors are contained within the ranges of contents represented by the following inequalities:

$$0.2 \leqq T \leqq 6 \quad (1)$$

$$6 \leqq X \leqq 15 \quad (2)$$

$$3 \leqq Y \leqq 14 \quad (3)$$

$$0 \leqq Z \leqq 11 \quad (4)$$

$$0.5 \leq X/(X+Y) \leq 5/6 \quad (5)$$

The reasons for requiring the above respective elements and the reasons for limiting the composition of the alloy, as above, may be explained in greater detail, with reference to the present invention.

An amorphous alloy according to the present invention mainly comprises a cobalt (Co). Among such alloys, an amorphous alloy having a saturation magnetization higher than 8 KGauss and low magnetostriction ($\lambda_s$) ($|\lambda_s| \leq 10^{-6}$) can be readily obtained.

The rhenium (Re) is contained in the amorphous alloy because the Re serves to raise the crystallization temperature of the alloy and lower the magnetostriction. The atomic density T of the Re is so set as to satisfy the above formula (1); since, if the atomic density T is lower than 0.2 and higher than 6, the adding effect of the Re cannot be readily obtained. The Re has also the effect of lowering the saturation magnetostriction constant of the alloy, with the addition of small amounts. When this effect is substantial, the saturation magnetostriction constant might become a negative value, with the addition of the Re. The atomic density T of the Re is set at a level higher than 0.2; since, if the Re is lower than 0.2, the effect whereby the saturation magnetostriction constant is lowered by the addition of the Re is lessened. The atomic density T of the Re is set lower than 6; since, if the Re is more than 6, the saturation magnetization of the alloy, by the addition of the Re, is reduced.

On the other hand, the Re has the effect of raising the saturation magnetization level of the alloy. Figure shows the variation in the saturation magnetization level which occurs in cases wherein the atomic density T of the Re is altered in the alloy $Co_{78.5-T}Re_T Hf_{11.5}B_{10.0}$, i.e., the saturation magnetization effect which occurs in cases wherein the Co is substituted for the Re. As is evident from the FIGURE, the saturation magnetization level of the alloy can be raised by setting the atomic density T of the Re within a range of from 0.2 to 1.5. Therefore, an amorphous alloy which has a high crystallization temperature, a low saturation magnetostriction constant and a high saturation magnetization level may be provided, by setting the atomic density T of the Re within a range of from 0.2 to 1.5.

The hafnium (Hf) is contained in the amorphous alloy according to the present invention because the Hf has the effect of raising the crystallization temperature of the alloy. The atomic density X of Hf is so set as to satisfy the above formula (2); since, if the X is lower than 6, a crystallization temperature higher than 500° C. cannot be obtained and, similarly, if the X is higher than 15, a crystallization temperature higher than 500° C. cannot be obtained and it will be difficult to raise the saturation magnetization level of the alloy above 8 KGauss.

The boron (B) is contained in the amorphous alloy of the invention because the B has the effect of aiding in the formation of the amorphous alloy and improving the physical properties of the alloy. The atomic density Y of the B is so set as to satisfy the above formula (3); since, if the Y is lower than 3, the effect of aiding in the formation of the amorphous alloy with the B is lessened and, if the Y is higher than 14, the rust resistance of the alloy deteriorates and brittleness is produced. It is preferable to set the atomic density Y of the B lower than 8; since, if the atomic density Y of the B is less than 8, the production of the amorphous alloy is facilitated and its wear resistance can be improved.

Further, it is preferable to set the X and Y at such a level as to satisfy the following inequality (5).

$$0.5 \leq X/(X+Y) \leq 5/6 \quad (5)$$

If the X/(X+Y) factor is lower than 0.5, the effect whereby the magnitude of the saturation magnetostriction is reduced by the addition of the Re cannot be obtained. If the X/(X+Y) factor is higher than 5/6, the formation of an amorphous alloy becomes difficult, and an amorphous alloy having high saturation magnetization cannot be obtained.

The addition of the silicon (Si) is effective in aiding the formation of the amorphous alloy. In this case, the atomic density Z of the Si is so set as to satisfy the above formula (4). The formation of the amorphous alloy can be performed by including another element, such as B, even if the Si is not contained in the alloy. Further, the atomic density Z of the Si is so set as to be lower than 11; since, if it is higher than 11, the effect of forming the amorphous alloy by the addition of the Si is lessened.

To obtain an amorphous alloy which has high saturation magnetic flux density and low coercive force; and, yet, does not have its effective magnetic permeability lowered, said amorphous alloy should not contain the Si. However, when the atomic density Z of the Si is set within a range of from 0 to 0.01, an alloy can be obtained which has magnetic properties substantially similar to an alloy having no Si. Therefore, it is preferable to set the atomic density Z of the Si within a range of from 0 to 0.01.

The amorphous alloy which contains the composition described above is produced by the steps of preparing powders of Co, Re, Hf, B and Si (as required) at a predetermined ratio, melting them, and forming the molten metals into an amorphous alloy by e.g., a liquid quenching method or a sputtering method. In this case, the amorphous alloy may be heat treated, as required.

A magnetic head can be produced from the core material which is obtained by machining the amorphous alloy in a predetermined shape. A rotary magnetic head device for a VTR can be constructed by mountaining the magnetic head on a rotor; or, a rotary magnetic head device might also be constructed by a thin film forming technique, by directly forming a core at a rotor and further forming a coil pattern.

The amorphous alloy according to the present invention has a crystallization temperature level higher than 500° C. and does sustain no decrease in its effective magnetic permeability, even if a heat treatment process with the gradual cooling needed for glass bonding is carried out to make a head tip. Therefore, a magnetic head which has excellent electromagnetic conversion properties, and magnetic properties such as a high saturation magnetization level, a low magnetostriction level, high effective magnetic permeability, high mechanical strength and high wear resistance can be obtained by fabricating the head from the amorphous alloy of the present invention.

Some examples of the invention may be described as follows, in conjunction with comparative examples. In Table, Examples 1 to 3 and Comparative Examples 1 to 5 of the Re-series amorphous alloy are listed.

TABLE

| | | Composition | Crystallization Temperature (°C.) | Saturation Magnetization (KG) | Effective Magnetic Permeability (500 KHz) | Effective Magnetic Permeability (5 MHz) | Coercive Force (Oe) | Saturation Magnetostriction ($\times 10^{-7}$) |
|---|---|---|---|---|---|---|---|---|
| Example | No. 1 | $Co_{77}Re_1Hf_{12}B_{10}$ | 620 | 8.0 | 1,500 | 400 | 0.05 | −1 |
| | No. 2 | $Co_{80}Re_2Hf_{12}B_6$ | 610 | 9.0 | 1,500 | 400 | 0.05 | −2 |
| | No. 3 | $Co_{82}Re_2Hf_{12}B_4$ | 600 | 9.5 | 1,600 | 450 | 0.03 | +2 |
| Comparative Example | No. 1 | $Co_{78}Re_1Hf_9B_{12}$ | 520 | 9.5 | 800 | 200 | 0.25 | −15 |
| | No. 2 | $Co_{73}Re_2Hf_{17}B_8$ | 550 | 4.0 | 1,000 | 250 | 0.20 | +15 |
| | No. 3 | $Co_{82}Hf_{12}B_6$ | 590 | 9.4 | 1,500 | 150 | 0.30 | +30 |
| | No. 4 | $Co_{80}Nb_2Hf_{12}B_6$ | 600 | 9.0 | 1,400 | 350 | 0.15 | +15 |
| | No. 5 | $(Co_{0.94}Fe_{0.06})_{78}Si_8B_{14}$ | 380 | 9.0 | 50 | 50 | 2.0 | +1 |

Amorphous alloys of the compositions listed in Table were respectively prepared by a liquid quenching method. More particularly, thin strip specimens of an amorphous alloy, which were 30 μm thick and 12 mm wide, were produced by injecting the molten alloys of the above compositions on the surface of a sole roll rotating at a high rate of speed in an argon gas atmosphere through argon gas under pressure (0.1–1.0 $Kg/cm^2$) from the nozzle of a quartz tube; and by then quenching the alloys.

Comparative Example 1 contained less than half the ratio $X/(X+Y)$ of the Hf to the sum of the Hf and the B, Comparative Example 2 contained Hf in such an amount that the atomic density Y of the Hf exceeded 15, Comparative Example 3 contained no Re, Comparative Example 4 contained Nb (instead of the Re), and Comparative Example 5 contained no Re and no Hf.

The following properties were measured, as below, for the thin strip specimens.

(i) Crystallization Temperature

The crystallization temperatures were measured by a differential thermal analyzer, in such a manner that the temperatures were determined by the heat starting temperature of the heating peak initially presented during the period of temperature rise.

(ii) Saturation Magnetization

Saturation Magnetization was determined by measuring the values of the magnetization of the respective specimens, in a magnetic field of 10 KOe, with a specimen vibration type magnetization measuring instrument.

(iii) Effective Magnetic Permeability

The thin strip specimens were punched in a ring shape, having a 10 mm outer diameter and an 8 mm inner diameter, and ten sheets of the specimens were laminated via interlayer insulators, i.e. sputtered films of soda glass having a softening point of 380° C. Then, after the laminate was heat treated at 500° C. to 530° C. for 30 min., it was gradually cooled at a rate of 3° C. per minute, and laminated cores were obtained. The laminated cores of the amorphous alloy were respectively wound with 30 turns of primary and secondary coils, the inductances were measured by an impedance meter, and the effective magnetic permeability μ' levels were obtained by calculation. The effective magnetic permeabilities were at the 500 KHz and 5 MHz levels for the Re-series amorphous alloy.

(iv) Coercive Force

The coercive forces were obtained by using specimens similar to those used in measuring the effective magnetic permeability, and by obtaining a DC magnetization curve with an automatic self-recording magnetic flux meter and calculating the coercive force from this curve.

(v) Saturation Magnetostriction Constant

The saturation magnetostriction constants were measured by a strain gauge method.

The compositions of the specimens and the measured values of magnetic properties were listed in Tables.

As may readily be seen from Table, in Comparative Example 1, the saturation magnetostriction constant is of a large value, since ratio $X/(X+Y)$ is less than 0.5; and Comparative Example 2 has an extremely small saturation magnetization value, since the atomic density of the Hf exceeds 15. Further, Comparative Examples 3 and 4 have remarkably large saturation magnetostriction constants, since Comparative Example 3 contained no Re and Comparative Example 4 contained Nb (instead of the Re). In addition, though the amorphous alloy of Comparative Example 5 was considered to exhibit excellent magnetic properties as a material for a conventional magnetic head; since the crystallization temperature is low, e.g., 380° C., it is crystallized by glass bonding at 500° C., and the value of the effective magnetic permeability after bonding becomes extremely small.

On the other hand, the amorphous alloys of Examples 1 to 3 all have high crystallization temperatures (higher than 500° C.) and high saturation magnetization levels (higher than 8 KGauss); sustain no deterioration in their effective magnetic permeabilities, even from the gradual cooling which occurs after glass bonding; and exhibit saturation magnetostriction constants of small value, such as on the order of $10^{-7}$, as an absolute value.

According to the present invention, as described above, a magnetic head using an amorphous alloy may be obtained, the magnetic properties of which are not influenced by glass bonding.

It is to be noted here that the Hf used in the amorphous alloys for the magnetic heads of Examples 5 to 7 were 99.8% pure; and, that, though such alloys are approx. 0.02% Zr in content, an impurity such as this (Zr) does not affect the advantages of the present invention. Even where Hf of relatively low purity (such as one which is 95% and is approx. 3% Zr in content) is employed, it has been confirmed that the advantages of the amorphous alloy according to the present invention can still be obtained.

What is claimed is:

1. An amorphous alloy for a magnetic head which, upon gradual cooling from a temperature of 500° C. at a speed of 3° C./minute, exhibits a minimum magnetic permeability above 350 at 5 MHz, and a coercivity maximum of 0.05 Oe, comprising a formula represented as follows:

$$Co_{100-T-X-Y-Z}Re_T Hf_X B_Y Si_Z,$$

where T, X, Y and Z respectively represent the atomic densities of elements Re, Hf, B and Si, and satisfy the following inequalities of formulae (1) to (5), as follows:

$$0.2 \leqq T \leqq 6 \quad (1)$$

$$6 \leqq X \leqq 15 \quad (2)$$

$$3 \leqq Y \leqq 14 \quad (3)$$

$$0 \leqq Z \leqq 11 \quad (4)$$

$$0.5 \leqq X/(X+Y) \leqq 5/6 \quad (5).$$

2. The amorphous alloy for a magnetic head according to claim 1, wherein the T factor satisfies the inequality of the following formula (6):

$$0.2 \leqq T \leqq 1.5 \quad (6).$$

3. The amorphous alloy for a magnetic head according to claim 2, wherein the Y factor satisfies the inequality of the following formula (7):

$$3 \leqq Y \leqq 8 \quad (7).$$

4. The amorphous alloy for a magnetic head according to claim 3, wherein the Z factor satisfies the inequality of the following formula (8):

$$0 \leqq Z \leqq 0.01 \quad (8).$$

5. A magnetic head with an amorphous alloy which exhibits a minimum magnetic permeability above 350 at 5 MHz, and a coercivity maximum of 0.05 Oe, after gradual cooling from 500° C. at 3° C./minute, comprising the core, wherein the core is composed of an amorphous alloy having a composition formula represented as follows:

$$Co_{100-T-X-Y-Z}Re_T Hf_X B_Y Si_Z,$$

where T, X, Y and Z respectively represent the atomic densities of elements Re, Hf, B and Si, and satisfy the following inequalities of formulae (1) to (5), as follows:

$$0.2 \leqq T \leqq 6 \quad (1)$$

$$6 \leqq X \leqq 15 \quad (2)$$

$$3 \leqq Y \leqq 14 \quad (3)$$

$$0 \leqq Z \leqq 11 \quad (4)$$

$$0.5 \leqq X/(X+Y) \leqq 5/6 \quad (5).$$

6. The magnetic head with an amorphous alloy according to claim 5, wherein the T factor satisfies the inequality of the following formula (6):

$$0.2 \leqq T \leqq 1.5 \quad (6).$$

7. The magnetic head with an amorphous alloy according to claim 6, wherein the Y factor satisfies the inequality of the following formula (7):

$$3 \leqq Y \leqq 8 \quad (7).$$

8. The magnetic head with an amorphous alloy according to claim 7, wherein the Z factor satisfies the inequality of the following formula (8):

$$0 \leqq Z \leqq 0.01 \quad (8).$$

* * * * *